3,356,007
EXHAUST PROTECTIVE COVER
Warren A. Clemons and Donald A. Schwenn, Columbia City, Ind., assignors to Viking, Inc., a corporation of Indiana
Filed Mar. 23, 1966, Ser. No. 536,771
1 Claim. (Cl. 98—59)

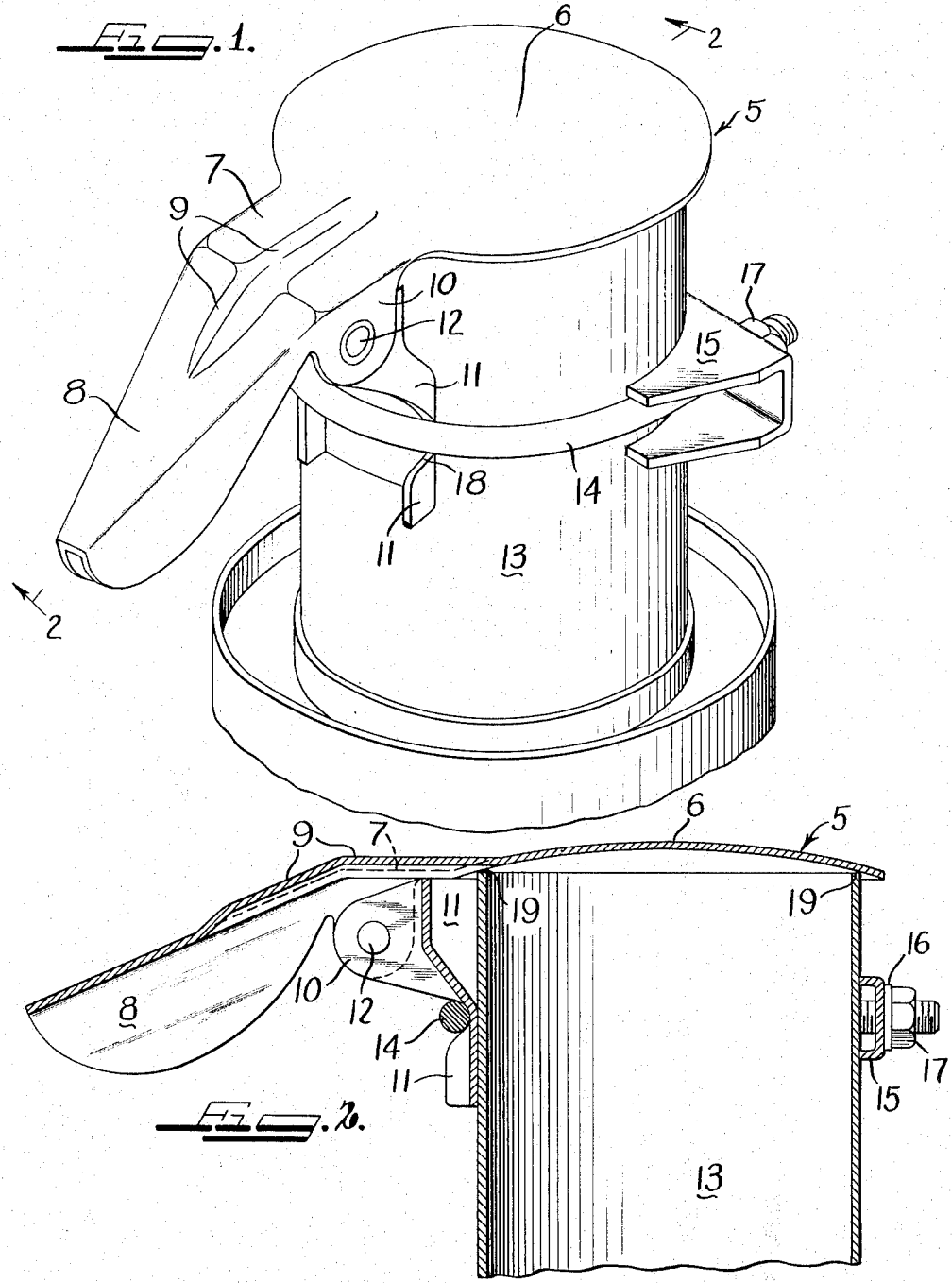

ABSTRACT OF THE DISCLOSURE

A self-acting protective cover for use on vertical exhaust pipes of internal combustion engines or the like designed to vent internally accumulated gases but to exclude weather elements and other external foreign matter.

The disclosure shows a pivoted concavo-convex cover for a pipe as, for example, an exhaust pipe, integrally counterbalanced so that the cap will close the exhaust pipe until a pressure from admitted gases, such as combustion products, will overcome the counterbalanced weight and cause the cap to open. The combination includes support means for the cover assembly, the cap and counterweight, and ribbed portions between the counterweight portion and the cap at a particular stress point.

---

This invention relates to self-acting protective cover for use on vertical exhaust pipes of internal combustion engines or as an automatic closure for natural gas or oil pipe lines, or furnace stacks or for any venting or other use wherein gases are intermittently emitted into the atmosphere and wherein exclusion of weather elements, insects and other foreign matter is desirable.

Other types of covers used heretofore have had the limitation of having been serviceable for only a specific pipe size or for a narrow range of pipe diameters, or such covers have had the disadvantage of jamming or freezing in the open position, therefore failing to perform their designed function. Others have had the disadvantage of being complicated in construction and difficult to manufacture or to assemble.

An object of our invention is to provide a single protective cover which is capable of being fitted to several different diameters of exhaust pipes.

Another object of this invention is to provide a cover which is self-actuated and therefore opens and closes over the discharge end of exhaust pipes without intervention of manual operation.

Another object of our invention is to provide a cover which prevents foreign matter from entering the exhaust pipe when the engine is not in operation.

Another object of this invention is to provide a cover which, because of its simplicity of construction, is easy to tool up and to manufacture.

A further object of our invention is to provide a cover which will operate freely without frequent lubrication.

Other objects and a further understanding of our invention may be had by referring to the following description and claims, taken in conjunction with the accompanying drawings in which:

FIGURE 1 is a perspective view of the protective cover assembly showing the cover in a closed position and the means for securing said cover as utilized in a typical installation.

FIGURE 2 is a sectional view taken along line 2—2 of FIGURE 1.

With reference to the drawings, cap 5 with center portion 6 has a convex-concave shape and is integral with segment 7 which, in turn, is integral with counterweight 8. Ribbed portion 9, which extends from cap 5 through segment 7 to counterweight 8, adds strength to this segment 7, of maximum stress. Flange 10 is secured to, and pivoted on, support 11 by means of bolt 12.

The cover assembly 5, 6, 7, 8 and 9 is secured to the discharge end of exhaust pipe 13 by means of C-bolt 14, clamp 15, lock washer 16 and nut 17. To prevent dislocation of said clamping assembly by vibration of exhaust pipe 13 during operation of the engine, C-bolt 14 is fitted within notch 18 of support 11.

In operation, let it be assumed that the protective cover assembly described above is installed on an upright exhaust pipe and is held firmly in place by means of the clamping assembly described above.

When the engine is not in operation, the cap 5 rests on periphery 19 of exhaust pipe 13, and is partially supported thereby. The construction of the cover assembly is such that cap 5, segment 7, and counterweight 8 are pivoted whereby total weight is distributed in such manner that cap 5 without pressure exerted on it, rests as aforesaid, on pipe 13. When the engine is started and is operating, gaseous and colloidal combustion products from said engine are temporarily confined within the exhaust pipe 13 by means of the cap 5 until the pressure exerted by such combustion products on the under or concave surface of said cap 5 plus the generally downward force of counterweight 8 forces cap 5 to yield upwardly and permit emission of said combustion products. Said cap 5 tends to remain in a lifted or open position so long as the engine is operating and combustion products are being produced to exert sufficient pressure to maintain said cap in such open position; however, at idling or low speed operation the cap may tend to close until pressure again opens it with resultant "fluttering" of the cap or a "chattering" sound.

When the engine is again idle and out of operation, the cap 5, without pressure exerted upon it by combustion products, then closes and rests on the periphery 19 of exhaust pipe 13.

When the engine is moving, such as travel by a vehicle in which it is installed, the cap 5 will tend to be subject to pressure of wind and air currents and will therefore tend to open or close, depending upon the position of the mounting of the protective cover assembly on the exhaust pipe.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

In an exhaust pipe protective cover assembly for internal combustion engines which are provided with a vertical exhaust, the combination of a vertical exhaust pipe, a cover assembly normally closing the open end of the exhaust pipe, first support means, a flange integral with said cover assembly and pivotally mounted on said first support means, said first support means having notched portions formed therein and second support means fitted within said notched portions, said second support means secured about said exhaust pipe by clamp means, a segment of said cover assembly having a ribbed portion integral with said flange and also integral with a cap at one end and a counterweight at a second end, said counterweight having relatively short length and being declined from horizontal, said cap having a convex-concave configuration and being yieldable to pressure upon its inner concave surface by combustion products produced during engine operation and to bias by said counterweight to an open or lifted or alternately open and closed position and, during engine shut down, said cap automatically closing to cover discharge end of said exhaust pipe.

References Cited

UNITED STATES PATENTS

| | | | |
|---|---|---|---|
| 2,463,662 | 3/1949 | Wallace | 98—59 |
| 2,537,099 | 1/1951 | Smith | 98—59 |
| 2,637,264 | 5/1953 | Harmon | 98—59 |
| 2,983,216 | 6/1961 | Stade et al. | 98—59 |
| 3,274,917 | 9/1966 | Tolbert | 98—59 |

ROBERT A. O'LEARY, *Primary Examiner.*

M. A. ANTONAKAS, *Assistant Examiner.*